Oct. 22, 1935.  W. HERRMANN ET AL  2,018,522
ELECTROLYTIC CONDENSER
Filed July 18, 1934.
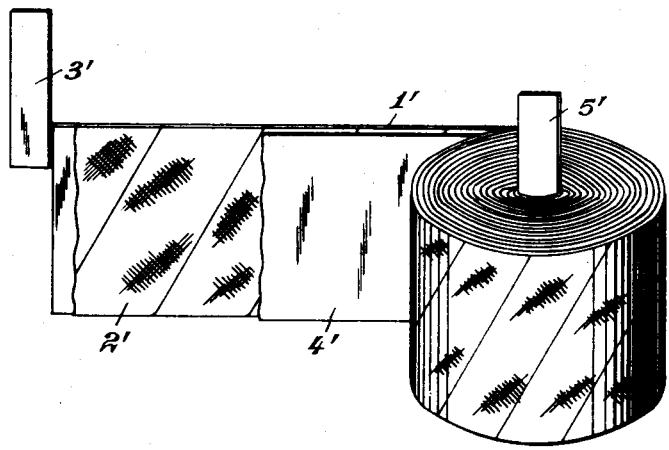
Inventors
Werner Herrmann
and Erich Evers
by Lotka & Kehlenbeck
Attorneys Patented Oct. 22, 1935

2,018,522

UNITED STATES PATENT OFFICE 2,018,522

ELECTROLYTIC CONDENSER

Werner Herrmann, Finkenkrug, near Berlin, and Erich Evers, Berlin-Wilmersdorf, Germany, assignors to Siemens & Halske, Aktiengesellschaft, Siemensstadt, near Berlin, Germany, a corporation of Germany Application July 18, 1934, Serial No. 735,728 In Germany August 8, 1932

2 Claims. (Cl. 175—315)

Electrolytic condensers, especially of the dry solid type, have already been made by using two metallic foils as electrodes and spacing them apart by means of a porous or permeable ribbon, one or more sheets of which are interposed between the two electrodes. This ribbon is impregnated with an electrolyte. In manufacturing such a condenser, of the coiled form for instance, at least three separate parts must be employed, namely the two electrodes and the porous ribbon or strip for securing a space between the electrodes. It will be understood that the manufacture of a condenser in coiled form is very difficult if a greater number of separate parts are present.

The method according to the invention provides a manner of considerably diminishing these difficulties by enveloping at least one electrode with a suitable spacing means and fixing it thereto before impregnating said means with electrolyte. In order to envelop the electrodes, according to the invention, the spacing means is spirally wrapped about the electrodes in such a manner that a bandage results.

The production of such spirally wrapped electrodes is very simple, because these electrodes can be made in any desired length and put in stock. Furthermore it is of importance that the edges of the enveloped electrode be electrically insulated in every direction. If the insulation is not made in the form of a spirally wound spacing strip, it would be easily possible for the fibres of the spacing means to come into a position parallel to the edges of the electrodes, and then a good insulation of the edges of the electrodes would not be obtained. This possibility is totally prevented by the spacing strip according to the invention.

By changing the pitch or angle of the spirally wound spacing strip or the degree of overlapping of the convolutions of the insulating ribbon or strip used for spacing the electrodes apart and for taking up the electrolyte, it is possible to produce an insulating layer of varying thickness in accordance with the practical conditions.

We prefer to use fabric, paper or similar porous substances as spacing means and for absorbing the electrolyte.

To give an example, if a fabric having a great ability for absorbing electrolyte is employed, an electrolytic condenser according to the invention can be built up by spirally wrapping only one electrode and winding it together with another metallic electrode in order to form the condenser body. The so produced compact body is then impregnated with a suitable electrolyte.

The use of paper instead of fabric has the considerable advantage of saving space and reducing expense, but because of its smaller ability of absorbing electrolyte it is better in this case to impregnate the wrapped electrode with electrolyte before winding it up with the other metallic electrode. The bandaged electrode may be impregnated by passing it through the electrolyte with which the electrode is to be used.

It is already known to pass strips or ribbons of paper or unwrapped metallic strips through vessels filled with electrolytes, in order to impregnate them, and after this procedure to wind them together in coiled form. In this well known method, however, difficulties arise because paper impregnated with electrolyte has little mechanical strength and therefore the so treated paper ribbons easily tear. Besides in this method an undesired change in the position of the paper ribbons with respect to each other often occurs during the movement through the impregnating liquid or during the winding up in spaced convolutions.

These difficulties are also totally avoided in the method according to the invention, and besides the advantage is obtained that the guiding means, rolls for instance, for the ribbons when the latter are moved through the bath are simplified.

If only one electrode is wrapped and used together with an untreated metallic strip serving as the second electrode for the formation of the condenser body, it is only necessary to move the wrapped electrode through the electrolytic bath. Thereby a very simple construction of the guiding rolls can be employed and the advantage is obtained that a stock roll for winding up the wrapped electrode after its impregnation can be provided. The electrodes are made of a metal, preferably aluminium, which is able to form an oxide film upon its surface.

It is possible to wrap that electrode on which an oxide film is to be formed, namely the anode, or if desired, the metallic cathode. In the case where the compact roll or the condenser body is impregnated, or where the anodes must be of a predetermined length with respect to the capacity of the condenser, it is advisable to wrap the anode, as a greater quantity of spacing material would be used for the cathode which is sometimes longer than the anode. Preferably the anode is first treated for some time in an oxidizing bath before arranging the spacing strip upon it and is once more treated for finishing the production of the oxide film after manufacturing the condenser body and after impregnating the same.

If the impregnation of the wrapped electrode with electrolyte is accomplished before making the condenser body, we prefer to use another method. In this case it is often not easy to cut off the wrapped anode in order to get the desired length when the anode leaves the electrolytic bath. As the length of the cathode, however, is not important with respect to the desired capacity of the condenser, it is possible to wrap the spacing strip around the cathode, to impregnate it and then to combine the same with an anode of the corresponding length for building up the condenser body.

The accompanying drawing shows a view of a suitable constructional form of the new condenser, the beginning of the coiled body being unwound only for better illustration.

In the drawing a thin metallic ribbon 1' serving as one electrode is provided with a spirally wound spacing strip 2' of insulating material, such as fabric or paper. This electrode has a projection 3' for circuit connection which is made by cutting in the electrode material partially and by folding the so formed little strip in such a manner that the free end of the strip lies outside of the ribbon 1'. Upon the spacing strip 2' is arranged another thin metallic ribbon 4 forming the second electrode and also having a contact lap 5' similar to 3'.

It will be seen that in the drawing only one electrode is spirally wrapped and the other electrode is wound around the spacing strip of the first one. The provision of a protecting cover of fibrous material in any suitable form is useful for making the condenser body insensible against external damage. In the case of arranging the condenser body on a support or within a vessel the insulating cover prevents contact between the particular convolutions or between these and the support.

What we claim is:

1. In the method of producing an electrolytic condenser, the steps of spirally winding a spacing strip of fibrous material on at least one thin metallic ribbon completely enclosing the ribbon, moving the wound ribbon through an electrolyte and winding it afterwards on a core.

2. In the method of producing an electrolytic condenser, the steps of spirally winding an absorbent spacing strip on a thin metallic ribbon completely enclosing the ribbon, moving said ribbon through an electrolyte, and winding it up afterwards together with another thin metallic ribbon.

ERICH EVERS.
WERNER HERRMANN.